United States Patent
Gasparri

(10) Patent No.: US 7,685,062 B2
(45) Date of Patent: Mar. 23, 2010

(54) COMPUTER SYSTEM FOR THE CALCULATION OF INTERESTS FOR ENTRUSTMENTS OF MONEY

(76) Inventor: Duccio Marco Gasparri, Via Dei Mille 8, I - 40121 Bologna (IT)

( * ) Notice: Subject to any disclaimer, the term of this patent is extended or adjusted under 35 U.S.C. 154(b) by 116 days.

(21) Appl. No.: 10/583,692

(22) PCT Filed: Dec. 21, 2004

(86) PCT No.: PCT/EP2004/014538

§ 371 (c)(1),
(2), (4) Date: Jun. 20, 2006

(87) PCT Pub. No.: WO2005/064504

PCT Pub. Date: Jul. 14, 2005

(65) Prior Publication Data

US 2007/0112666 A1 May 17, 2007

(30) Foreign Application Priority Data

Dec. 24, 2003 (IT) .......................... MI2003A2597

(51) Int. Cl.
*G06Q 40/00* (2006.01)
(52) U.S. Cl. .......................................... 705/38; 705/35
(58) Field of Classification Search .............. 705/35–45
See application file for complete search history.

(56) References Cited

U.S. PATENT DOCUMENTS

2003/0130883 A1* 7/2003 Schroeder et al. ............. 705/10
2005/0177485 A1* 8/2005 Peter ............................ 705/35

OTHER PUBLICATIONS

Una McCaffrey, Be wary of interest-only, Jun. 27, 2002, Irish Times, p. 58.*
Ronald Field, Mysteries revealed in buying a home, Oct. 23, 1994, The Salt Lake Tribune, p. F.4.*
PCT International Preliminary Report on Patentability.*
Texas Instruments, TI-89 TI-92 Plus Guidebook for Advanced Mathematics.*
Nobuyuki Oda and Jun Muranaga, "A New Framework for Measuring the Credit Risk of a Portfolio: The "ExVaR" Model", Monetary and Economic Studies of the Bank of Japan, Dec. 1997, pp. 27-62.
Douglas W. Dwyer et al., "Moody's KMV RiskCalc™ v3.1 Model", Moody's KMV Company, Apr. 5, 2004, pp. 1-36.
Edward I. Altman et al., "The Link between Default and Recovery Rates: Theory, Empirical Evidence, and Implications", The Journal of Business, 2005, vol. 78, No. 6, pp. 2203-2227.

(Continued)

*Primary Examiner*—Hani Kazimi
*Assistant Examiner*—Hao Fu
(74) *Attorney, Agent, or Firm*—Pearne & Gordon LLP

(57) ABSTRACT

Procedure for the calculation of interests for entrustments of money comprising: memorization of quantities of money K indicative of the possible amounts of credit granted; memorization of an additional remuneration M indicative of the requirements of the lender for granting the loan; processing of an additional amount of money L indicative of the risk of loss borne by the lender; and mathematical combination, according to a given formula, of the aforementioned quantity of money K, extra yield M and amount of money L, in order to obtain a quantity of money B that, asked of the borrower, allows the lender to obtain an average return of (K+M).

16 Claims, 4 Drawing Sheets

OTHER PUBLICATIONS

Moody's KMV Company, "EDF Overview", at least as early as Jun. 19, 2006, pp. 1-2.

Robert C. Merton, "Theory of Rational Option Pricing", The Bell Journal of Economics and Management Science, Spring, 1973, vol. 4, No. 1, pp. 141-183.

Fischer Black and Myron Scholes, "The Pricing of Options and Corporate Liabilities", The Journal of Political Economy, May-Jun. 1973, vol. 81, No. 3, pp. 637-654.

Robert C. Merton, "On the Pricing of Corporate Debt: The Risk Structure of Interest Rates", The Journal of Finance, May 1974, vol. 29, No. 2, pp. 449-470.

Edward I. Altman et al., "ZETA™ Analysis, A new model to identify bankruptcy risk of corporations", The Journal of Banking and Finance, 1977, vol. 1, pp. 29-54.

Edward I. Altman, "Measuring Corporate Bond Mortality and Performance", The Journal of Finance, Sep. 1989, vol. 44, No. 4, pp. 909-922.

Paul Asquith et al., "Original Issue High Yield Bonds: Aging Analyses of Defaults, Exchanges, and Calls", The Journal of Finance, Sep. 1989, vol. 44, No. 4, pp. 923-952.

Greg M. Gupton et al., "CreditMetrics™—Technical Document", J.P. Morgan & Co. Inc., New York, Apr. 2, 1997, pp. i-xii, 1-200.

* cited by examiner

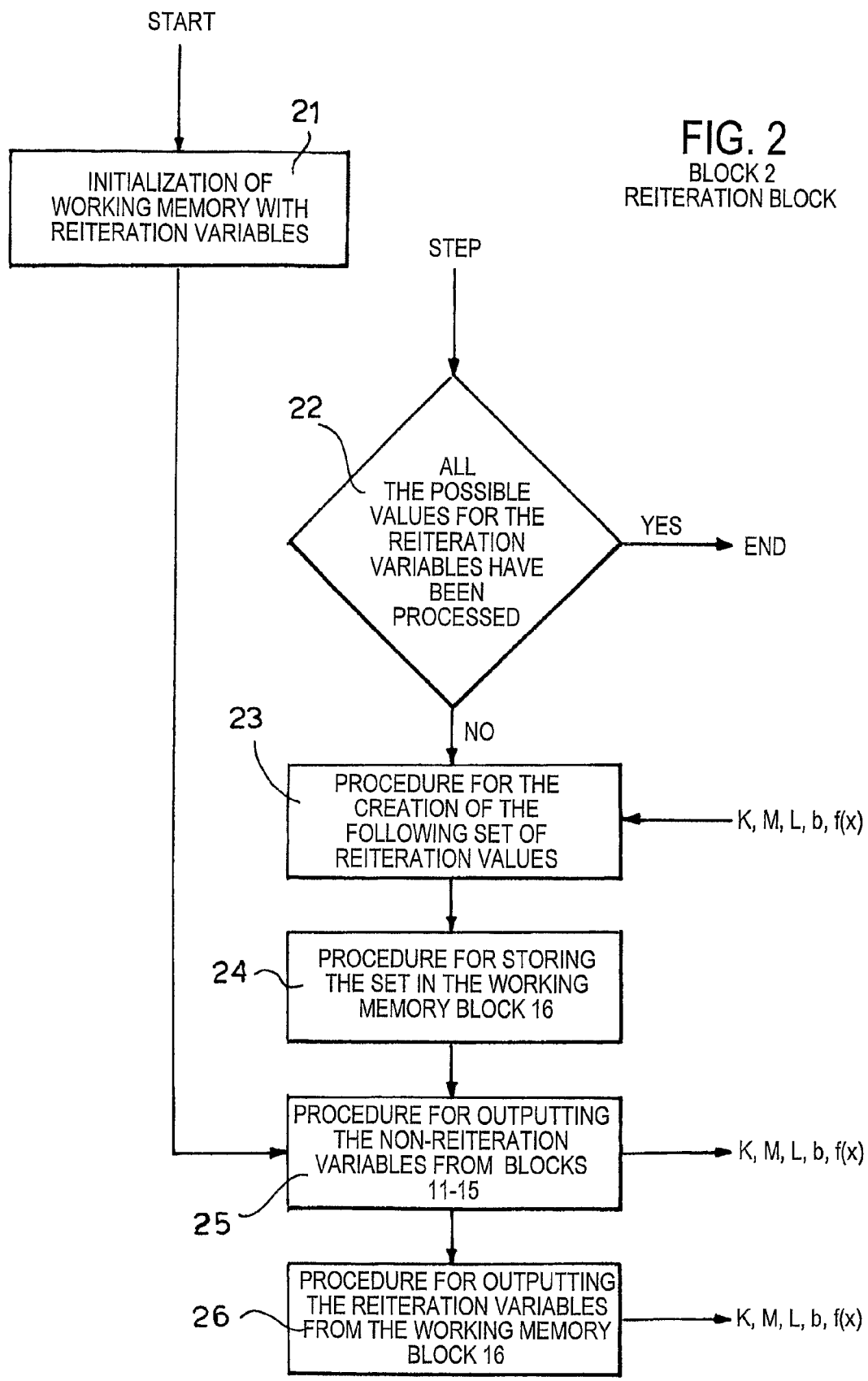

EQUATION SOLVING BLOCK 3

COMPUTER SYSTEM FOR THE CALCULATION OF INTERESTS FOR ENTRUSTMENTS OF MONEY

The present invention concerns a method for the calculation of interests for entrustments of money, called Extra-Required Interest (ERI), and the computer apparatus with the appropriate software for the implementation of that method in a way suitable for human needs.

Various methodologies for the calculation of interest rates are known. Comparison pricing methods performs an historical analysis of granted loans to check how many times money were not reimbursed, how much money the lender lost in each case, and what the interest rate applied was. Then the borrower characteristics are scrutinized, and compared to the historical set to determine whether the actual borrower is predisposed to perform in a better or worse way. Several methods are available: subjective analytical methods, methods based on R. C. Merton's teachings (Merton R. C., 1974, "On the pricing of corporate debt"), such as CreditMetrics ("CreditMetrics. Technical Document", 1997, J.P. Morgan & Co), KMV models (KMW Corporation), Extended Var (N. Oda and J. Muranaga), Zeta Model (Altman E. I., Haldeman R., Narayanan P., "ZETA Analysis: A New Model to Identify Bankruptcy Risk of Corporations," Journal of Banking and Finance, June 1977), methods based on Neural Networks, Option Pricing Model (Black and Scholes (1973) and Merton (1974)), and the Mortality Rate Model (Altman (1989) and Asquith, Paul, David W. Mullins and Eric D. Wolff (1989)). This inspection may produce, as result, a dichotomous judgment (trustworthy versus untrustworthy), or a grade in a standard scale (such as the well known rating from AAA to D by Standard & Poor's). By this standard, an interest rate equal to the one of the past borrowers who had the same standard is applied to the new borrower.

Comparison pricing is based on the assumption that actual borrowers pay a "correct" interest rate: the so called perfect efficiency of markets. This theory has been criticized by many researchers, because empirical evidence disproves the supposed efficiency. Moreover, comparison pricing methods require the definition of homogenous groups of borrowers, but objective characteristics that are relevant in the definition of such groups have not yet been defined unambiguously.

Intrinsic value pricing methods instead attempt to find a correct gain from the intrinsic characteristics of the company, such as its financial solidity and past performances.

The additive model is the simplest of the Intrinsic value pricing methods:

$$IR = IRR + EL + (Ke - IRR) * VaR$$

IR is the interest rate, IRR is the Internal Return Rate, Ke is the expected return for shareholders, VaR is the Value at Risk (a measure of the risk of excessive loss). EL is the expected loss, $EL = E(T_I)[1 - E(T_R)]$. $E(T_I)$ is the expected insolvency rate, and $E(T_R)$ is the recovery rate in case of default. Despite its apparent simplicity, the additive model is hard to calculate because of the VaR. Furthermore, it does not calculate, nor it highlights, the effects of the correlation of $E(T_I)$ and $E(T_R)$ (Altman E., Resti A., Sironi A., "The Link Between Default and Recovery Rates: Theory, Empirical Evidence and Implications", in *Journal of Business*, 2004).

The method of this invention for the calculation of interests for entrustments of money (ERI) is a new method that produces precise, useful and tangible results in the field of economics, especially in the banking industry, yet use on its own is restricted by its expensiveness in term of resources, especially time. Indeed the ERI, which is basically composed of a mathematical formula and of the steps to solve it, for its intrinsic characteristics requires a huge amount of time to be performed by "hand and mind", time that is not compatible with human activities.

The computer apparatus and software solves the problem of the enormous amount of calculation necessary to perform the procedure, by executing the necessary steps in a reasonable time frame, an achievement that would be impossible for a human being. The computer apparatus and software, along with the procedure, creates a device useful for industrial use, especially in the banking sector.

One field in which the ERI could have the most relevant impact is the calculation of an adequate interest rate for the loans granted. The banking industry is always seeking improved methods for the evaluation of both single loans and entire portfolios.

The Extra Required Interest helps to find the extra amount of capital that should be appropriated by the lender, out of the borrower cash flow, if an average quantity of money (K+M)—or any good of equivalent value—is sought by the lender. The exact value of the cash flow of the borrower is usually unknown when the ERI is used, but its probability density function $f(x)$ can be estimated. The ERI works under the hypothesis that the transfer of money from the borrower to the lender is limited between established lower and upper values.

The most common application of the ERI is to obtain a precise value of the upper limit that allows to reach the average reimbursement (K+M), under the hypothesis that the lower limit and the probability density function of the cash flow are known and considered unmodifiable. The total quantity of money that should be asked by the lender is the upper limit, which is usually the sum of the capital lent K, the interest M and a quantity of money L for protecting the lender from eventual losses.

The method can be reiterated with different quantities of debt granted, different quantities of interest M, and different hypothesis of distribution $f(x)$.

The procedure starts with a given quantity of money (K+M) that the lender wants to recoup in a future time. However, the amount reimbursed is aleatory, because it is taken from the quantity of money available to the borrower at the time of payback. That quantity can usually be described through a probability density function $f(x)$.

The quantity received by the lender is limited in both its lower and upper value. The minimum—called "b"—is often zero, but it can be less, in case of unfruitful recoupment costs (such as lawyer fees); it can also be more than zero, for the presence of collateral guarantees (such as mortgages). The minimum is equal to b, and any lower quantity of money available must be regarded by the lender as being equal to the minimum. The maximum—called B—is the quantity of money that, by contract, the borrower must pay back to the lender at the time of reimbursement. The ERI can give valuable insight for the B value.

What is sought by the lender is the value L which, asked of the borrower along with K and M, makes the expected quantity of money recouped equal to the desired quantity (K+M). Once L is known, if the quantity of money that can be collected from the borrower is greater than (K+M+L) (because contractually it was decided so by the parties), the lender receives an average quantity of money greater than the awaited (K+M). On the opposite, if the contract stipulated among the parties provides a quantity of money to be recouped lower than (K+M+L), the lender probably gains less than expected. The variability of the amount depends on the variance of $f(x)$, but does not affect the average amount recouped.

The ERI is a new, powerful procedure that helps to overcome some limitations of the currently available methods, therefore the ERI, and the device that enables its implementation, can provide a tangible improvement to the actual state of the art.

The present invention provides a method and a multi-purpose device suitable for reaching an average reimbursement (K+M) on a loan, every time an aleatory variable X that represents the borrower cash flow, and of the following all but one are supplied: a probability density function $f(x)$ for this aleatory variable, a lower limit "b" and a higher limit "B", the desired outcome (K+M). The present invention covers all the situations in which any value of X lower than, or equal to the bottom of the interval "b" must be accounted for at the value "b", while any value greater than, or equal to, the—usually unknown—upper limit "B" must be accounted for at the value "B".

The device has a memory space dedicated to the function $f(x)$, which is the probability density function of the aleatory variable X. $f(x)$ can be a discrete or continuous probability density function. In the following description, for simplicity's sake, it will be treated as a continuous function until equation 11. The endowed software requires the input of function $f(x)$. All the inputs of this invention can be entered through a keyboard, or they can be derived from another software useful to this purpose, or they can be extracted from a database in which the data is stored, or from any other way useful to introduce the required data.

The device has a dedicated memory space for the variables K, M, b, B in their useful form. K and M are, added together, the average point to be reached. The variable K can be a single value, a vector of values or an interval [k;K] with or without a discrete value for the step ΔK. The variable M can have any of the forms of K, or it can be a function of any kind with independent variable K. The variable b is usually a single value, even though it can be a function of K. The variable B is usually the term sought, in which case it should have the form of a single value, a vector or any other form useful for the intended purposes. The endowed software requires the input of K, M, b, B if they are known.

A function that describes the upper limit "B" in terms of K, M, L is defined as B(K,M,L,λ). The variable λ regulates whether, in the calculus of the value of B, taxes should be included or not. The formula of B is used in different situations; in some of them, the value of B should be net of taxes, while in others only the gross value is required. B(K,M,L,λ), formulated in this way, can be applied in both situations: if λ is zero, taxes are not calculated and subtracted; otherwise, to subtract the taxes in order to obtain the net value, it is sufficient to set λ equal to γ, which is the per cent value of the tax actually in force. The formula of B(K,M,L,λ) can change accordingly to the needs, such as, but not limited to, B(K,M,L,λ)=K[1+(L/K)(1−λ)][1+(M/K)(1−λ)] or the one used here, $$B(K,M,L,\lambda)=\alpha K+L(1-\lambda)+M(1-\lambda) \tag{1}$$

α represents the percentage of capital reimbursed in the time period considered. α is real and can have any value between 0<α≦1. If α is equal to one, the loan is totally reimbursed in this time period. Otherwise, the loan structure provides for a reimbursement schedule lasting more than the single period. In the following lines, for simplicity's sake, a single period loan will be assumed.

The device has a dedicated "work" memory space in which to store the variable X and any required data or function, in their useful form.

The T(x;b,K,B,γ) function is defined:

$$T(x;b,K,B,\gamma) = \begin{cases} b & x < b \\ x & b \leq x < K \\ K+(x-K)(1-\gamma) & K \leq x < B \\ K+(B-K)(1-\gamma) & B \leq x \end{cases} \tag{2}$$

This function trims the upper and lower values of the aleatory variable X, to keep it inside the desired interval. Variable B is the upper part of the interval, which is usually given by B(K,M,L,0).

Once all the variables are defined, there are several paths that can be followed to achieve the desired output.

If the distribution function $f(x)$ is continuous, and the values used are absolute, the following should be applied:

$$B(K,M,0,\gamma)=K+M(1-\gamma)=\int_{-\infty}^{+\infty} T(x;b,K,B(K,M,L,0),\gamma) f(x)dx \tag{3}$$

If the cumulative distribution function F(x) of $f(x)$ is known, it is possible to use it for the upper and lower value of the interval, instead of the integral.

$\int_{-\infty}^{+\infty} f(x)dx$ is by definition equal to one, therefore the (3) can be also written in other equivalent ways. A term can be brought inside of the integral:

$$\int_{-\infty}^{+\infty} \{T(x;b,K,B(K,M,L,0),\gamma) - B(K,M,0,\gamma)\} f(x)dx == \\ \int_{-\infty}^{+\infty} \{B(K,M,0,\gamma) - T(x;b,K,B(K,M,L,0),\gamma)\} f(x)dx = 0 \tag{4}$$

The integral of (3) and (4) can be split into two or more integrals (−∞<α<+∞):

$$\int_{-\infty}^{\alpha} \{T(x;b,K,B(K,M,L,0),\gamma)-B(K,M,0,\gamma)\} f(x)dx+ \\ \int_{\alpha}^{+\infty} \{T(x;b,K,B(K,M,L,0),\gamma)-B(K,M,0,\gamma)\} f(x)dx=0 \tag{5}$$

One of the resulting integrals can also be brought on the other side of the equation, and the sign can be changed both inside and outside of the integral, as follows:

$$\int_{-\infty}^{\alpha} \{T(x;b,K,B(K,M,L,0),\gamma)-B(K,M,0,\gamma)\} f(x)dx= \\ \int_{\alpha}^{+\infty} \{B(K,M,0,\gamma)-T(x;b,K,B(K,M,L,0),\gamma)\} f(x)dx \tag{6}$$

A term can also be added to both sides, inside or outside of the integral:

$$\int_{-\infty}^{+\infty} [B(K,M,L,\gamma)-T(x;b,K,B(K,M,L,0),\gamma)] f(x)dx=L(1-\gamma) \tag{7}$$

This form is peculiar, because part of the integration interval is useless: the term [B(K,M,L,γ)−T(x;b,K,B(K,M,L,0),γ)] is zero for any value greater than B(K,M,L,0). Therefore, the integration interval can be reduced:

$$\int_{-\infty}^{B(K,M,L,0)} [B(K,M,L,\gamma)-T(x;b,K,B(K,M,L,0),\gamma)] f(x)dx=L(1-\gamma) \tag{8}$$

Equations (3), (4), (5), (6), (7),(8) can be expressed in per cent values of K. Defining $i_L$—interest rate for protecting the lender from losses—as $i_L$=L/K, and $i_M$—the gain sought by the lender—as $i_M$=M/K, the formula of B becomes:

$$B(K,i_M K,i_L K,\lambda)=K+i_M K(1-\lambda)+i_L K(1-\lambda)=K(1+i_M(1-\lambda)+i_L(1-\lambda)) \tag{9}$$

Equations (3), (4), (5), (6), (7), (8) can be adapted accordingly. The following is an example with equation (3):

$$[1 + i_M(1-\gamma)] = \frac{\int_{-\infty}^{+\infty} T(x; b, K, B(K, i_M K, i_L K, 0), \gamma)f(x)dx}{K} \quad (10)$$

If the probability density function $f(x)$ is discrete, equation (3) becomes:

$$K + M = \sum_{x \in \chi}[T(x; b, K, B(K, M, L, 0), \gamma)f(x)] \quad (11)$$

Equations (3), (4), (5), (6), (7), (8) and (10) are just examples of the many possible variations. The same exact variations can be applied to (11), without changing its result. Those equations can also be adapted to work with different formulations of (1), such as:

$$T^*(x; b, K, B, \gamma) = \begin{cases} K + (B-K)(1-\gamma) - b & x < b \\ K + (B-K)(1-\gamma) - x & b \le x < K \\ (B-x)(1-\gamma) & K \le x < B \\ 0 & B \le x \end{cases} \quad (12)$$

Any of (3), (4), (5), (6), (7), (8), (10) and (11) can be adapted to (12). For example, equation (8) becomes:

$$\int_{-\infty}^{B(K,M,L,0)}[T^*(x;b,K,B(K,M,L,0),\gamma)]f(x)dx = L(1-\gamma) \quad (13)$$

Due to their equivalence and full interchangeability, (3), (4), (5), (6), (7), (8), (10), (11) and (13) will be referred simply as "integral equations", without any mention of which of them is applied. With the available data, and with the integral equation, it is now possible to find the required parameter.

The first step is to try to solve analytically the integral equation for the parameter sought. However, the analytical solution is not always possible. Indeed, the integral equation may present probability density functions, such as the Normal distribution, that are not integrable without recurring to numerical methods and error functions. Furthermore, the probability density function may as well be a list of past occurring values with their relative frequencies. If the analytical solution is not available, the correct value of the term sought can be found through numerical integration methods, such as the Trapezium Rule, Simpson's Rule, Gaussian integration or Monte Carlo methods.

Once the correct value is found, it is stored in the proper allocated memory, and the process is reiterated until solutions are found for all the independent reiteration variables, such as K.

The solutions are then produced as output, in the form of a table, a 2D or 3D graph, or any format suitable for the intended use.

K and M are expressed as two separate entities because K is the capital lent, which is not usually subject to taxation. Moreover, M, L and the same K are often expressed as a percentage of K.

M can be broken down into the sum of F and M (or their equivalents $i_F$ and $i_M$ expressed as a percentage of K). F is the risk-free rate obtained from investing the amount K in government bonds; M is the extra-yield required by the lender to accept the variance of the income, $i_F$, $i_M$ and $i_L$, combined accordingly to $B(K,M,L,\lambda)$, create i, that is the yield factor that turns the loan into an actuarially equal investment. If the lender does not want to bear a loss, it should ask for an interest rate equal or greater than i.

The procedure described is standard and objective, because no subjective factor has any influence: equal input always produces equal output. Therefore, the procedure can be totally automated, and performed by a technical device created accordingly. The result produced by this device corresponds perfectly to the expectancy of the users. The resources required by this device are more suitable for an industrial setting than the procedure performed on its own by hand. A common procedure for granting a loan usually needs to know the minimum required interest rate for different values of K (let's say 10 different values). Some sensitivity analysis is also performed: higher and lower than estimated means and variances for $f(x)$ are usually tested, in order to check how the loan would perform if the hypotheses of $f(x)$ were wrong. Supposing one single value greater, and one single value lower than estimated, the combination gives 9 different possibilities. In the more than optimistic hypothesis that 10 attempts are enough to solve the integral equation by trial and error, the total number of iterations necessary to complete the procedure is 900. Even the most skilled person would require a lot of time to complete the procedure. Even if the problem of finding a solution for the integrals is delegated to a computer, just the act of entering the parameters for 900 equations is, by itself, an almost impossible task. With a rough estimate of one minute for each iteration, the single loan would require 15 hours of work by a person skilled in mathematics. The device not only reduces the time required to a few seconds, but it also drastically lowers the operator skills required.

Further characteristics of the invention will appear clearer from the detailed description that follows, referring to its purely exemplifying forms and so not limiting its realization, illustrated with the aid of the attached designs, in which:

FIG. 2 is a flow chart illustrating the working procedure of the Reiteration Block of FIG. 1;

Figure 1:
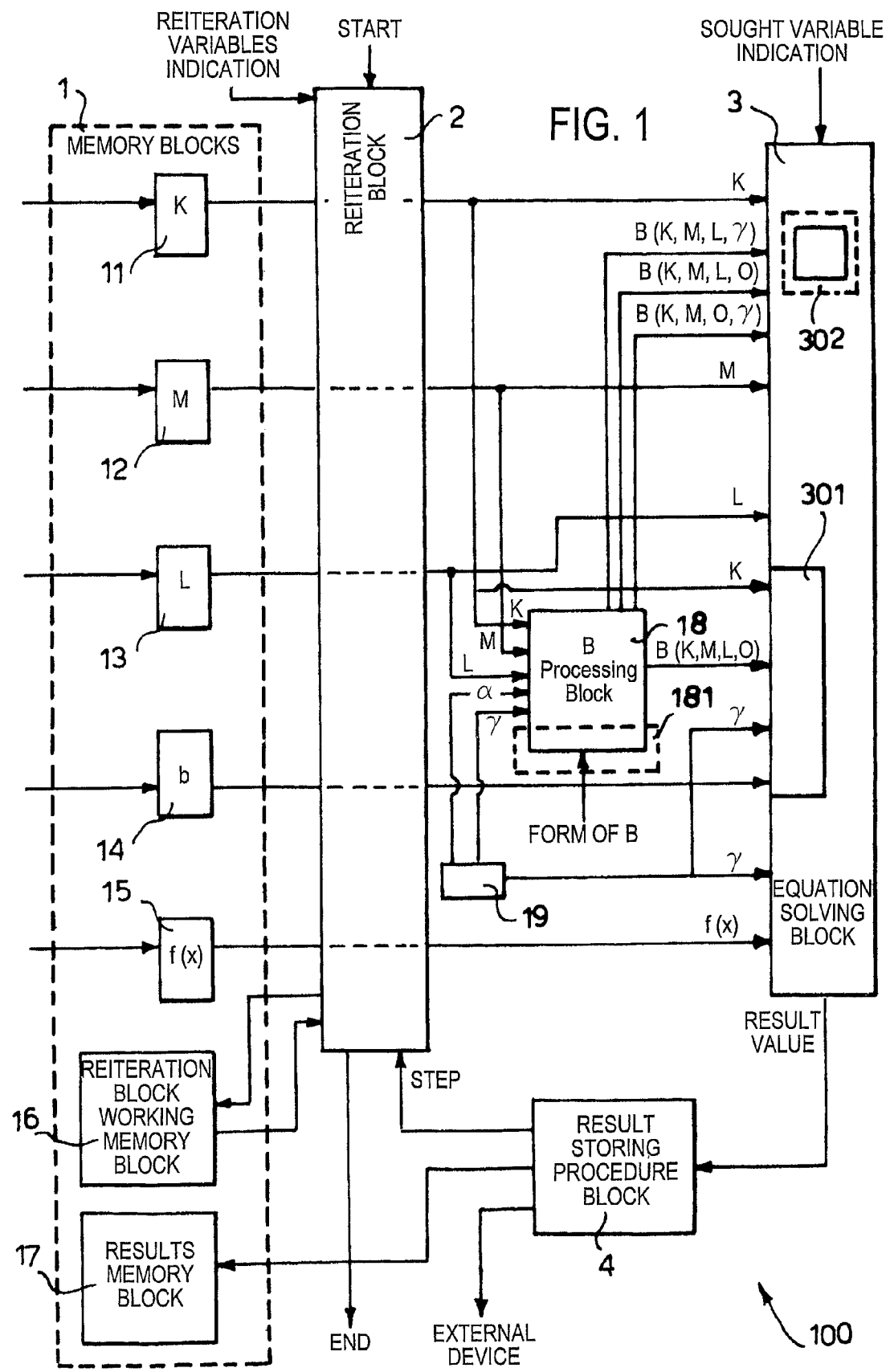
FIG. 1 is a block diagram illustrating the device according to the invention.
Figure 1A:
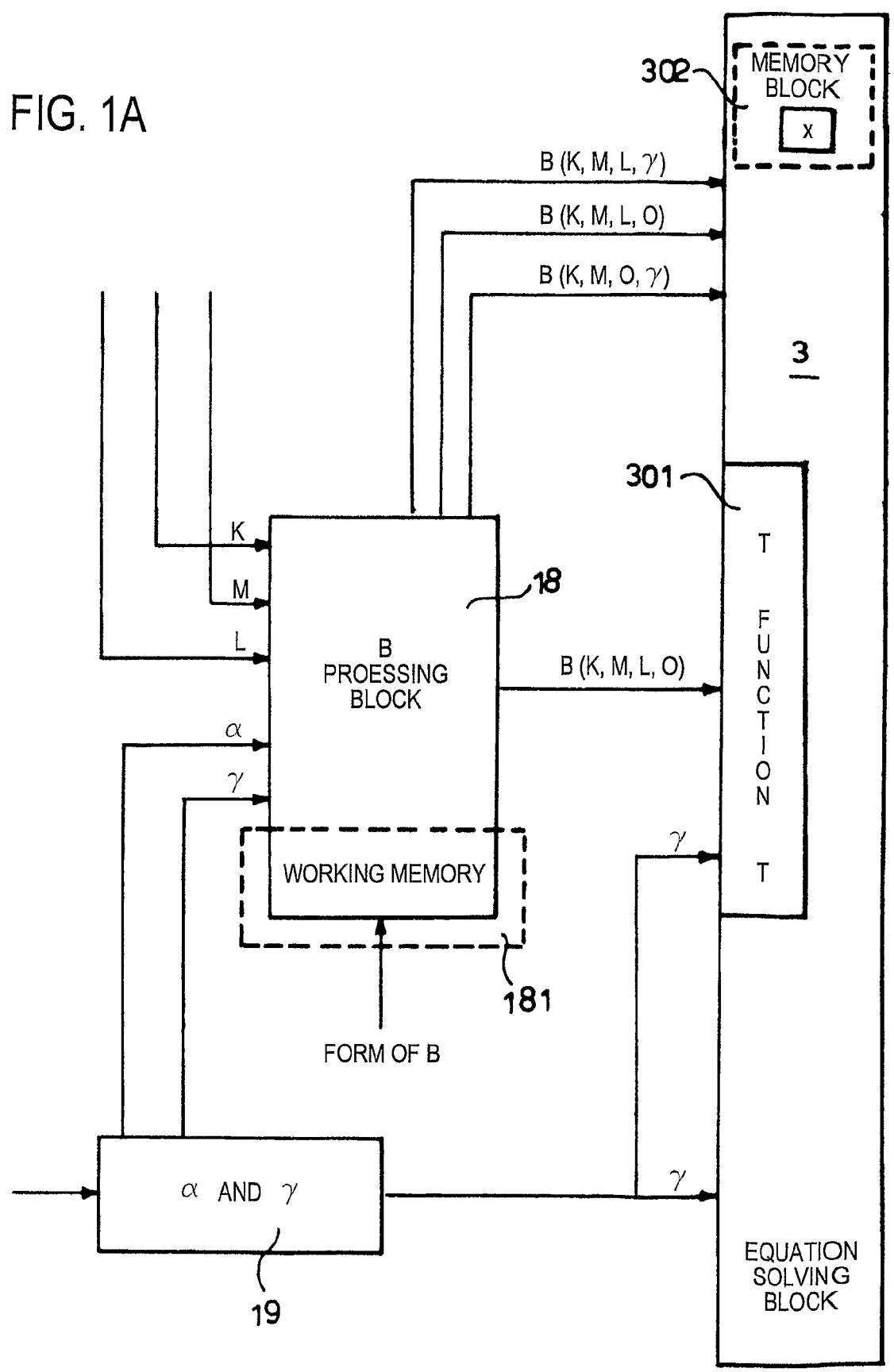
FIG. 1A is block diagram illustrating in more details the B Processing Block 18 of FIG. 1

With the aid of FIG. 1 is described a device (100) that implements the procedure according to the invention.

The device 100 is formed by a Memory Block 1, a Reiteration Block 2, an Equation Solving Block 3, a B Processing Block 18, and a Result-storing Procedure Block 4. Memory Block 1 is a storage device that holds:

input parameters (Blocks 11, 12, 13, 14, 15, 19) input by the user, a form of an equation B input by the user into the Working Memory 181 of B Processing Block 18, as disclosed below, a Working Memory 16 of the Reiteration Block 2, a Processing Memory 302 of the Equation Solving Block 3, and a Results Memory Block 17 of the Result-storing Procedure Block 4.

The input parameters comprise the following variables input by the user: capital lent K (block 11), interest M (Block 12), additional interest for protection L (Block 13), percentage of capital lent to be reimbursed α (Block 19) and applicable taxes γ (Block 19) and minimum recoupment of money b (Block 14). Those inputs can have the form of a single value, of a vector of values, of an interval with or without a discrete value Δ for the step, of a function with any useful independent variable.

The input parameters further comprise probability density functions of the borrower f(x) (Block 15). The forms of $f(x)$ are input by the user.

Therefore the Memory Block 1 is subdivided into sub-blocks: a block of memory 11 to store capital lent K, a block of memory 12 to store interest M, a block of memory 13 to store additional interest for protection L, a block of memory 14 to store the minimum recoupment of money b, a block of memory 15 to store the probability density function of the borrower $f(x)$, the Working Memory block 16 of the Reiteration Block 2, a block of memory 17 to store the results of the process, a block of memory 181 to store the form of equation B and its current formulation, a block of memory 19 to store the percentage of capital lent to be reimbursed α and the applicable taxes γ.

Reiteration Block 2 is a processing block that controls the reiteration of the process. It determines which variables are at the base of the reiteration process, and it keeps track of the advance of the reiteration through its Reiteration Block Working Memory Block 16. Reiteration Block 2 then feeds the subsequent Blocks with only the correct data needed to perform the procedure.

B Processing Block 18 receives the following variables: capital lent K (from Reiteration Block 2), interest M (from Reiteration Block 2), additional interest for protection L (from Reiteration Block 2), percentage of capital lent to be reimbursed α (from Memory Block 19) and applicable taxes γ (from Memory Block 19).

B Processing Block 18 produces as output a function B(K, M,L,λ) according to functions (1) or (12) previous disclosed, or to any equivalent formulation.

Equation Solving Block 3 implements an integral equation according to equations (3), (10), (11), (13) previous disclosed, or to any equivalent formulation, and the means and procedure for solving above-mentioned integral equation.

Result-storing Procedure Block 4 is fed with the Result Value from Equation Solving Block 3. Result-storing Procedure Block 4 implements the means and procedure either to store, in the appropriate form, the result into Results Memory Block 17, or to feed this result into an External Device, such as a printer. Result-storing Procedure Block 4 ends by activating the Step procedure of Reiteration Block 2 (FIGS. 1 and 2).

The Equation Solving Block 3 comprises a T-function Block 31. T-function Block 31 implements the means and procedure for executing a Trim function according to function (2), or any other formulation of the Trim function, such as the function (12). Memory Block 302 stores the integrating variable x.

At the beginning of the process, all the available variables and/or functions are loaded into their relative Memory Blocks 11, 12, 13, 14, 15, 18, 19.

According to the needs, the memory block of the sought variable is left empty. Which one of the Memory Block remains empty is indicated to the procedure with the Sought Variable Indication input.

Reiteration Block 2 accepts as input the list of the reiterated variables (step 21) through the Reiteration Variables Indication, and, as shown in FIG. 2, goes to step 25 of its procedure, where it produces as output, in their original values, the variables that are not reiteration variables. In step 26 it produces as output the reiteration variables as stored in its Working Memory Block 16.

Capital lent K, interest M and additional interest for protection L produced by Reiteration Block 2 enter B Processing Block 18, along with percentage of capital lent to be reimbursed α and applicable taxes γ (both from Memory Block 19).

In B Processing Block 18 functions B(K,M,•,•) are created. Block 18 calculates B(K,M,L,γ), B(K,M,L,0) and B(K,M,0,γ), which are used by Equation Solving Block 3.

The output B(K,M,L,0) of B Processing Block 18, along with minimum recoupment of money b from Reiteration Block 2 and applicable taxes γ from Memory Block 19, enters T Function Block 31.

Capital lent K, interest M and additional interest for protection L, probability density function of the borrower $f(x)$ from Reiteration Block 2, B(K,M,L,γ), B(K,M,L,0) and B(K,M,0,γ) from B Processing Block 18, the applicable taxes γ and the Sought Variable Indication from the operator, enter Equation Solving Block 3.

Figure 3:
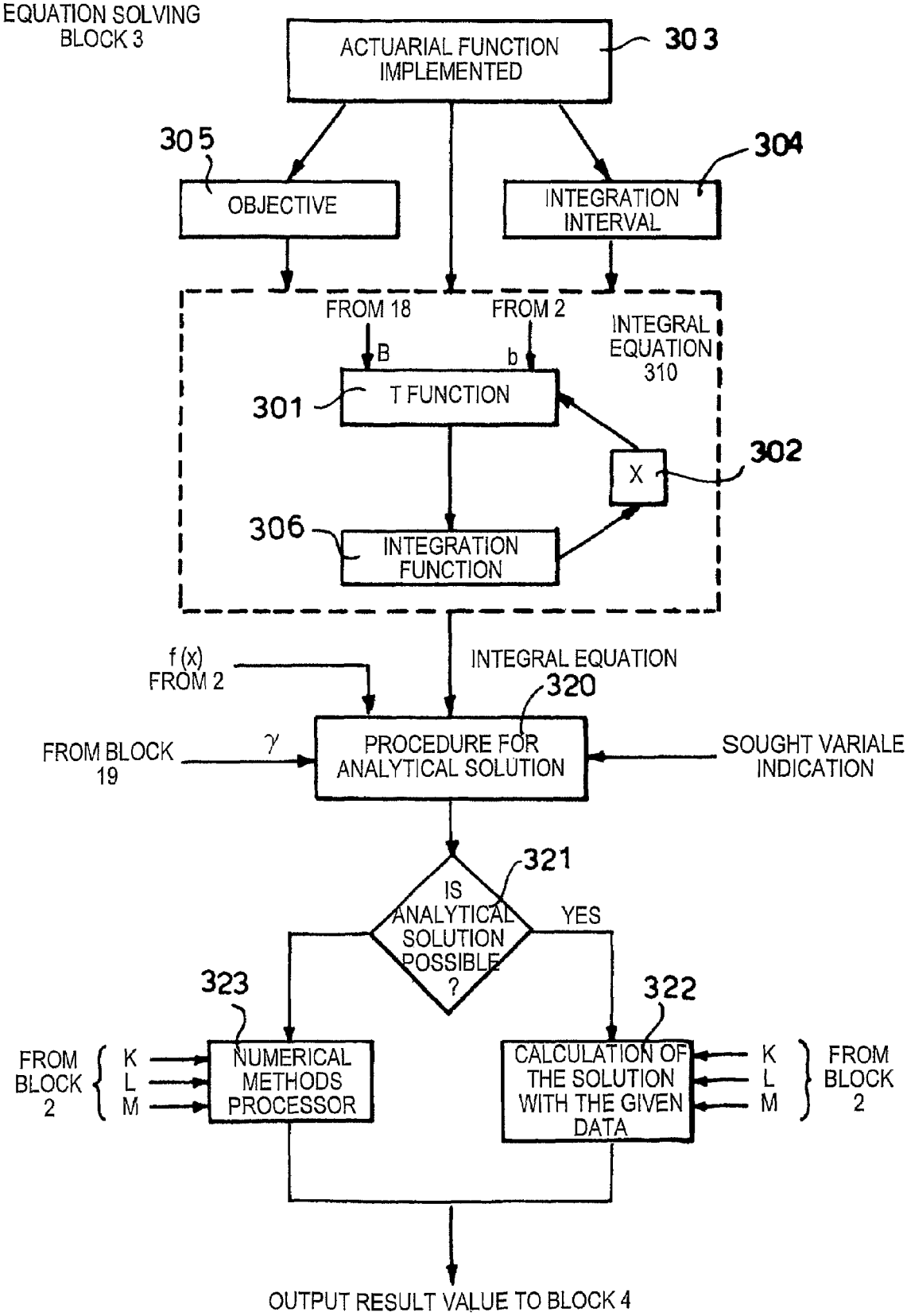
FIG. 3 is a block diagram illustrating the Equation Solving Block of FIG. 1.

Equation Solving Block 3, as shown in FIG. 3, stores a Actuarial Function 303 that has been implemented. The Actuarial Function 303 can be one of equations (3), (10), (11), or any of their equivalent formulations.

Actuarial Function 303 can have its own objective, defined in Objective Block 305 (such as B(K,M,0,γ) for equation (3) or L(1-γ) for equation (7)).

Equation Solving Block 3 also stores an Integration Interval 304.

Equation Solving Block 3 defines an Integral Equation 310, that is composed by the T Function 301, the Integration Function 306 (given by Actuarial Function 303, Objective Block 305 and Integration Interval 304), and the Integrating Variable X with its relative Memory Block 302.

The Integral Equation 310 is fed, along with probability density function of the borrower $f(x)$ from Reiteration Block 2, Sought Variable Indication and applicable taxes γ from Memory Block 19, into a Procedure For the Analytical Solution 320. Procedure For the Analytical Solution 320 attempts to find an analytical solution of the Integral Equation 310. If the attempt is successful, Procedure For the Analytical Solution 320 produces as output the solution of the Integral Equation 310. Otherwise, it produces as output the Integral Equation 310 along with an error signal.

The output of Procedure For the Analytical Solution 320 is entered into Decision Block 321, that determines whether the analytical solution was possible. In the case of an affirmative answer, the analytical formula of the solution is fed into a Calculation Block 322, along with the ones of the following terms capital lent K, interest M and additional interest for protection L that are not the variable sought. Otherwise, the procedure continues to a Numerical Methods Processor 323, which receives all the previous data from Decision Block 321, along with the ones of the terms capital lent K, interest M and additional interest for protection L that are not the variable sought. The result of either Calculation Block 322 or Numerical Methods Processor 323 is the output of Equation Solving Block 3.

Equation-Solving Block 3 produces Result Value as output, which is fed into Result-Storing Procedure Block 4. This block stores the result value into Results Memory Block 17 in the appropriate form, such as a graph or a list of values. Then, the block gives instruction to Reiteration Block 2 to perform the next reiteration step, called Step.

Reiteration Block 2, as shown in FIG. 2, starts from step 22 where it checks if all the values of the reiteration variables have been processed. In case of affirmative answer, it ends the procedure. Otherwise, it creates the next set of values for the reiteration variables (step 23), which is then stored into its Working Memory Block 16 (step 24). The procedure starts off again with step 25.

The procedure according to the invention can be implemented by hardware components installed on a dedicated computer that, in accordance with the introduced data, produces as a result the sought parameter.

Output of device 100, or the output of Result Storing Procedure Block 4, can be connected to a display or printer for visualizing or printing a table and/or a graph with the results of the device 100.

The procedure can be implemented with dedicated software. This software can be installed in the computer memory, or memorized in a data medium or storage device that can be read with a computer.

The invention claimed is:

1. A computer implemented method for calculating interests for entrustments of money (K) comprising the following steps:
   loading a number representing quantities of money K into a memory of a computer system, wherein money K indicates possible amounts of credit granted;
   loading a number representing an additional remuneration M into said memory of said computer system, wherein said additional remuneration M indicates the requirements of the lender for granting the loan;
   processing, by means of said computer system, an additional amount of money L indicative of the risk of loss borne by the lender;
   performing a mathematical combination of the aforementioned quantity of money K, extra yield M and amount of money L, and eventual taxes to be calculated λ, by using said computer system, wherein the combination is performed according to a given formula, in order to obtain a function B(K,M,L,λ) representative of a quantity of money that, asked of the borrower, allows the lender to obtain an average return of (K+M), said function B(K,M,L,λ) being defined as follows:

$$B(K, M, L, \lambda) = \alpha K + L(1 - \lambda) + M(1 - \lambda)$$

wherein α represents the percentage of capital reimbursed in the time period considered,
   determining by means of said computer system an interest for entrustment of said quantities of money K as a function of said quantities of money K, additional remuneration M and additional amount of money L,
   said processor determining said additional amount of money L through an implicit equation
   processing said quantity of money K, said taxes λ,and said function B according to a trim function T(x;b,K,B,γ) weighted with a probability density function (f(x)) of a cash flow of the borrower,
   said trim function T(x;b,K,B,γ) having four intervals: less than the minimum recoupment of money b, equal to or greater than b and less than K, equal to or greater than K and less than B, equal to or greater than B,
   wherein said trim function T(x;b,K,B,γ) gives the following results:
   if x is less than b, the result is b
   if x is equal to or greater than b and less than K, the result is x
   if x is equal to or greater than K and less than B, K is subtracted from x, and the result is multiplied by (one minus lambda), and K is added to the result
   if x is equal to or greater than B, K is subtracted from B, the result is multiplied by (1−λ), and K is added to the result,
   wherein said trim function T(x;b,K,B,γ) is defined as follows:

$$T(x; b, K, B, \gamma) = \begin{cases} b & x < b \\ x & b \leq x < K \\ K + (x - K)(1 - \gamma) & K \leq x < B \\ K + (B - K)(1 - \gamma) & B \leq x \end{cases}.$$

2. Method according to claim 1, wherein the aforementioned combination carried out by said computer system is an addition of the quantity of money K with extra yield M and amount of money L.

3. Method according to claim 2, wherein said computer system carries out a multiplication of extra yield M and amount of money L by a term (1−λ) representing the eventual applicable taxes, before carrying out said addition.

4. Method according to claim 1, wherein the probability density function (f(x)) is a continuous function, and the weighting is done with an integral through an integral equation.

5. Method according to claim 1, wherein the probability density function (f(x)) is a discrete function, and the weighting is done with a summation.

6. Method according to claim 1, wherein said computer system, through said trim function T(x;b,K,B,γ), performs a comparison between the cash flow (X) generated by the borrower with threshold values.

7. Method according to claim 1, wherein said additional amount of money L, is made explicit by said computer system through an analytical solution.

8. Method according to claim 1, wherein said additional amount of money L, is made explicit by said computer system through numerical methods or with the aid of error functions.

9. Method according to claim 1, wherein the extra yield M and additional amount of money L are expressed by said computer system as a percentage of K, respectively extra interest rate $i_M$=M/K and additional interest rate $i_L$=L/K.

10. Method according to claim 9, wherein said computer system determines said extra interest rate $i_M$ by performing the sum of risk-free rate $i_F$ plus a mark-up $i_M$* for the lender for accepting the increased variability of its future revenues.

11. Method according to claim 1, further comprising a reiteration step for significative values of the input reiteration variables, including the amount of money K.

12. Method according to claim 11, wherein the output of the reiteration step is stored in a vector or list in said memory of said computer system, or plotted by said computer system on a graph that represents the total amount of money B(K,M,L,O) for any significant value of the reiterative variables.

13. A system for calculating interests for entrustments of money comprising:
   a first Memory configured to store data from the user,
   a Processor configured to process quantity of money K, extra yield M, additional amount of money L, and eventual taxes to be calculated λ, into a function B(K,M,L,λ) set by the user and representative of a quantity of money that, asked of the borrower, allows the lender to obtain an average return of (K+M), said function B(K.M,L,λ) being defined as follows:

$$B(K, M, L, \lambda) = \alpha K + L(1 - \lambda) + M(1 - \lambda)$$

wherein α represents the percentage of capital reimbursed in the time period considered, said Processor being configured to determine an interest for entrustment of said quantity of money K as a function of said quantity of money K, extra yield M and additional amount of money L, said Processor being configured to process said quantity of money K, said taxes λ, and said function B according to a trim function T(x;b,K,B,γ) weighted with a probability density function (f(x)) of a cash flow of the borrower, said trim function T(x;b,k,B,γ) having four intervals: less than the minimum recoupment of money b, equal to or greater than b and less than K, equal to or greater than K and less than B, equal to or greater than B, wherein said trim function T(x;b,K,B,γ) gives the following results:

if x is less than b, the result is b if x is equal to or greater than b and less than K, the result is x if x is equal to or greater than K and less than B, K is subtracted from x, and the result is multiplied by (one minus lambda), and K is added to the result if x is equal to or greater than B, K is subtracted from B, the result is multiplied by (1−λ), and K is added to the result, wherein said trim function T(x;b,K,B,γ) is defined as follows:

$$T(x; b, K, B, \gamma) = \begin{cases} b & x < b \\ x & b \leq x < K \\ K + (x - K)(1 - \gamma) & K \leq x < B \\ K + (B - K)(1 - \gamma) & B \leq x \end{cases}$$

said Processor being configured to find the dependant variable sought, by making it analytically explicit, or with the aid of numerical methods, said Processor being configured to determine said additional amount of money L by solving an implicit equation, and a second Memory configured to store a result provided by said processor.

14. System according to claim 13, wherein said Memory comprises:

a memory register configured to store quantities of money K, a memory register configured to store extra yield M, a memory register configured to store an additional amount of money L, a memory register configured to store the minimum recoupment of money b, a memory register configured to store a distribution function (f(x)), memory register configured to store the function B, a memory register configured to store percentage of capital lent to be reimbursed α and applicable taxes λ.

15. A computer readable medium storing a computer program which when executed by a computer causes the computer to perform the following steps:

loading a number representing quantities of money K into a memory of a computer system, wherein money K indicates possible amounts of credit granted;

loading a number representing an additional remuneration M into said memory of said computer system, wherein said additional remuneration M indicates the requirements of the lender for granting the loan;

processing, by means of said computer system, an additional amount of money L indicative of the risk of loss borne by the lender;

performing a mathematical combination of the aforementioned quantity of money K, extra yield M and amount of money L, and eventual taxes to be calculated λ, by using said computer system, wherein the combination is performed according to a given formula, in order to obtain a function B(K,M,L,λ) representative of a quantity of money that, asked of the borrower, allows the lender to obtain an average return of (K+M), said function B(K,M,L,λ) being defined as follows:

$$B(K, M, L, \lambda) = \alpha K + L(1 - \lambda) + M(1 - \lambda)$$

wherein α represents the percentage of capital reimbursed in the time period considered, determining by means of said computer system an interest for entrustment of said quantities of money K as a function of said quantities of money K, additional remuneration M and additional amount of money L, said processor determining said additional amount of money L through an implicit equation processing said quantity of money K, said taxes λ, and said function B according to a trim function T(x;b,K,B,γ) weighted with a probability density function (f(x)) of a cash flow of the borrower, said trim function T(x;b,K,B,γ) having four intervals: less than the minimum recoupment of money b, equal to or greater than b and less than K, equal to or greater than K and less than B, equal to or greater than B, wherein said trim function T(x;b,K,B,γ) gives the following results:

if x is less than b, the result is b if x is equal to or greater than b and less than K, the result is x if x is equal to or greater than K and less than B, K is subtracted from x, and the result is multiplied by (one minus lambda), and K is added to the result if x is equal to or greater than B, K is subtracted from B, the result is multiplied by (1−λ), and K is added to the result wherein said trim function T(x;b,K,B,γ) is defined as follows:

$$T(x; b, K, B, \gamma) = \begin{cases} b & x < b \\ x & b \leq x < K \\ K + (x - K)(1 - \gamma) & K \leq x < B \\ K + (B - K)(1 - \gamma) & B \leq x \end{cases}.$$

16. A system for calculating interests for entrustments of money comprising:

a first Memory configured to store data from the user, a Processor configured to process quantity of money K, extra yield M, additional amount of money L, and eventual taxes to be calculated λ, into a function B(K,M,L,λ) set by the user and representative of a quantity of money that, asked of the borrower, allows the lender to obtain an average return of (K+M), said function B(K,M,L,λ) being defined as follows:

$$B(K, M, L, \lambda) = \alpha K + L(1 - \lambda) + M(1 - \lambda)$$

wherein α represents the percentage of capital reimbursed in the time period considered, said Processor being configured to determine an interest for entrustment of said quantity of money K as a function of said quantity of money K, extra yield M and additional amount of money L, said Processor being configured to process said quantity of money K, said taxes λ, and said function B according to a trim function T(x;b,K,B,γ) weighted with a probability density function (f(x)) of a cash flow of the borrower, said trim function T(x;b,K,B,γ) having four intervals: less than the minimum recoupment of money b, equal to or greater than b and less than K, equal to or greater than K and less than B, equal to or greater than B, wherein said trim function T(x;b,K,B,γ) gives the following results:

if x is less than b, the result is b if x is equal to or greater than b and less than K, the result is x if x is equal to or greater than K and less than B, K is subtracted from x, and the result is multiplied by (one minus lambda), and K is added to the result if x is equal to or greater than B, K is subtracted from B, the result is multiplied by (1−λ), and K is added to the result, wherein said trim function T(x;b,K,B,γ) is defined as follows:

$$T(x; b, K, B, \gamma) = \begin{cases} b & x < b \\ x & b \leq x < K \\ K + (x - K)(1 - \gamma) & K \leq x < B \\ K + (B - K)(1 - \gamma) & B \leq x \end{cases}$$

said Processor being configured to find the dependant variable sought, by making it analytically explicit, or with the aid of numerical methods, said Processor being configured to determine said additional amount of money L by solving an implicit equation, said Processor being configured to repeat the procedure with all the combinations of values that are of interest to the operator, and a second Memory configured to store a result provided by said processor.

* * * * *